(12) United States Patent
Miyazaki et al.

(10) Patent No.: US 8,350,829 B2
(45) Date of Patent: Jan. 8, 2013

(54) INPUT PEN FOR TOUCH-PANEL AND TOUCH-PANEL INPUT SYSTEM

(75) Inventors: Shinichi Miyazaki, Osaka (JP); Masakazu Wada, Osaka (JP); Kengo Takahama, Osaka (JP); Toshiaki Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

(21) Appl. No.: 12/811,054

(22) PCT Filed: Nov. 4, 2008

(86) PCT No.: PCT/JP2008/070063
§ 371 (c)(1),
(2), (4) Date: Jun. 28, 2010

(87) PCT Pub. No.: WO2009/090789
PCT Pub. Date: Jul. 23, 2009

(65) Prior Publication Data
US 2010/0283764 A1     Nov. 11, 2010

(30) Foreign Application Priority Data
Jan. 15, 2008  (JP) .................................. 2008-006216

(51) Int. Cl.
*G06F 3/033* (2006.01)
*G06F 3/042* (2006.01)
(52) U.S. Cl. ..................... 345/175; 345/179; 178/19.05
(58) Field of Classification Search .................. 345/175, 345/179; 178/18.01–18.09, 18.11, 19.01–19.07
See application file for complete search history.

(56) References Cited

U.S. PATENT DOCUMENTS

| | | | |
|---|---|---|---|
| 2003/0213624 A1 * | 11/2003 | Cross et al. | 178/18.06 |
| 2006/0007224 A1 | 1/2006 | Hayashi et al. | |
| 2007/0035689 A1 * | 2/2007 | Ryu | 349/149 |
| 2007/0120836 A1 | 5/2007 | Yamaguchi | |

FOREIGN PATENT DOCUMENTS

| | | |
|---|---|---|
| CN | 1156489 A | 8/1997 |
| JP | 2006-18219 | 1/2006 |
| JP | 2007-172581 | 7/2007 |

OTHER PUBLICATIONS

International Search Report for PCT/JP2008/070063, mailed Dec. 2, 2008.

* cited by examiner

*Primary Examiner* — Stephen Sherman
(74) *Attorney, Agent, or Firm* — Nixon & Vanderhye P.C.

(57) ABSTRACT

An input pen (60) of the present invention is an input pen used for performing an input to a touch-panel-integrated liquid crystal display device (100) (display device). The liquid crystal display device (100) includes a plurality of photosensitive elements (30) that senses light transmitted through a panel surface. The photosensitive elements (30) detect a position of input by sensing an image on a surface of a display panel. The input pen (60) includes a retroreflective element (61) at its tip that is to be in contact with the display panel. The retroreflective element (61) is made up of a spherical glass (62) (spherical transparent member) and an elastic reflective element (63). In this way, it is possible to provide an input pen which is to be used with a touch-panel-integrated display device and which makes it possible to perform a more accurate position detection.

4 Claims, 4 Drawing Sheets

INPUT PEN FOR TOUCH-PANEL AND TOUCH-PANEL INPUT SYSTEM

This application is the U.S. national phase of International Application No. PCT/JP2008/070063 filed 4 Nov. 2008, which designated the U.S. and claims priority to JP Application No. 2008-006216 filed 15 Jan. 2008, the entire contents of each of which are hereby incorporated by reference.

TECHNICAL FIELD

The present invention relates to an input pen used for performing an input to a touch-panel-integrated display device that has a touch-panel function, and to a touch-panel input system including the input pen.

BACKGROUND ART

Touch-panel-integrated display devices having a touch-panel function are being developed among display devices such as liquid crystal display devices. These touch-panel-integrated display devices can detect a position of contact on a panel surface touched by using an input pen.

Dominant types of input pens used in conventional touch-panel-integrated display devices include resistance-film-type input pens (i.e. a type of input pen in which a position of input is detected by having an upper conductive substrate be in contact with a lower conductive substrate, due to application of pressure) and electrostatic capacity input pens (i.e. a type of input pen in which a position of input is detected by detecting a change in capacitance of a touched location).

In recent years, technology has been progressing which is related to liquid crystal display devices in which photosensitive elements such as photodiodes and phototransistors are provided for each pixel (or for each group of pixels) inside an image display area (e.g., see Patent Literature 1). By embedding photosensitive elements for each pixel in this way, it has become possible to achieve scanner functions and touch-panel functions in standard liquid crystal display devices. In other words, by having the photosensitive elements function as area sensors, it is possible to achieve the touch-panel-integrated liquid crystal display devices.

CITATION LIST

Patent Literature 1
Japanese Patent Application Publication, Tokukai, No. 2006-18219 (Publication Date: Jan. 19, 2006)

SUMMARY OF INVENTION

In a case where a liquid crystal display device including such photosensitive elements is used as a display device having a touch-panel function, the photosensitive elements pick up, as an image, a pen or a finger displayed on a display panel of the display device. Then, the liquid crystal display device performs a position detection by sensing a position of a tip of the pen or the finger.

In the touch-panel-integrated display devices configured as above, a proposal has been made of a configuration in which a light source such as a light-emitting diode is provided in the input pen, in order to enable the photosensitive elements to sense a position of a pen input more precisely. Such input pens provided with a light source are called "LED penlights".

In this way, because light of the light-emitting diode is irradiated from the pen tip on a liquid crystal display panel, the input pens provided with the light source enable the photosensitive elements provided inside the liquid crystal display panel to recognize the position of the pen more easily.

However, with the input pens configured as above, a problem occurs that the position of input is incorrectly detected at a shifted position. Reasons for this problem are as follows.

Usually, when a user uses a pen to touch a panel, a panel surface is not touched from directly above the display panel (that it to say, from a direction perpendicular to the panel surface), but rather touched at an angle of about 45° (for example) with respect to the liquid crystal display panel surface.

As a result, with the above configuration, because the light irradiated from the light source that is provided in the pen is incident on the liquid crystal display panel surface by having an oblique directivity with respect to the liquid crystal display panel surface, a problem occurs that the input is erroneously sensed as being an input at a position slightly shifted from an actual position of the input.

FIG. 6 shows a typical example of a pen input performed on a panel surface of a liquid crystal display device including photosensitive elements, by using an input pen that includes a light source. As shown in FIG. 6, a light source 161 such as a light-emitting diode mounted in an input pen 160 has a directivity as indicated in FIG. 6 by an arrow. Accordingly, if the pen is put in contact obliquely with the panel surface, the light irradiated from the input pen is detected as having a higher amount of light by a photosensitive element 30b that is disposed at a slightly shifted location, rather than being detected by a photosensitive element 30a, which is disposed directly under the actual position of input. In this way, with the input pen provided with the light source, such a problem occurs that the input is erroneously sensed at a position slightly shifted from the actual position of input.

The present invention is attained in view of the above problems. An object of the present invention is to provide an input pen to be used with a touch-panel-integrated display device, which enables a more accurate position detection.

In order to solve the above problems, an input pen in accordance with the present invention is an input pen for performing an input to a touch-panel-integrated display device, the touch-panel-integrated display device including a plurality of photosensitive elements for sensing light transmitted through a panel surface, and the touch-panel-integrated display device detecting a position of input by having the plurality of photosensitive elements sense an image on a surface of a display panel, the input pen including a retroreflective member being provided at a tip of the input pen that is to be in contact with the display panel.

An input pen in accordance with the present invention is used for performing an input to a touch-panel-integrated display device, which touch-panel-integrated display device is a display device having a touch-panel function by including photosensitive elements that are used as area sensors.

So that the photosensitive elements can detect the position of the pen input, it is necessary for the pen tip of the input pen to be easily detectable by the photosensitive elements. Several configurations are possibly considered to achieve this feature: for example, a configuration in which the pen tip itself is luminous, or a configuration in which a reflectivity of the pen tip is enhanced. However, if a light-emitting diode and the like is mounted in the pen tip so that the pen itself is luminous, directivity of the light emitted from the input pen varies depending on an angle of inclination of the pen with respect to the surface of a liquid crystal panel, which causes the position where the input pen is in contact with the panel to be detected at a position slightly shifted from the actual position of input. Further, merely providing the pen tip with a material having a highly reflective mirrored surface does not make it possible to enhance reflectivity in a satisfactory way, as a problem occurs that it is not possible to control a direction of reflection of the light; for example, in a case where the panel surface is touched by the pen in an inclining manner, the light is reflected in a direction shifted from the actual position of input. This makes it impossible to accurately detect the position of input.

In this regard, the present invention has a retroreflective member provided in the pen tip of the input pen as described above. A retroreflective member is a member that has a function to reflect incident light to mainly a direction from which the light is incident.

With the above configuration, it is possible to retroreflect for example light irradiated from a backlight and transmitted through a display panel, by use of the retroreflective member provided in the pen tip of the input pen. In this way, an amount of light irradiated from the pen tip is markedly higher than an amount of light irradiated from other positions, thereby making it possible to perform position detection more easily and more accurately.

Further, light originating from a light source and the like of the backlight which is irradiated and transmitted through the display panel has a directivity perpendicular to the surface of the display panel. As a result, since the retroreflective member is provided on an extremity of the input pen, it is similarly possible to reflect this light having the directivity perpendicular to the surface of the display panel as light which also has a directivity perpendicular to the surface of the display panel. In this way, even if the input pen is put in contact with the panel at an inclined angle, the photosensitive elements disposed directly under the position of input are able to sense a high amount of light, thereby making it possible to perform a more accurate detection of the inputted position.

Further, no light source and power supply for the light source is necessarily provided in the input pen as in the conventional technology. This makes it possible to obtain a lightweight and low-cost input pen.

In an input pen in accordance with the present invention, the retroreflective member may be a retroreflective bead. The retroreflective bead may for example be made of (i) a spherical transparent member (for example glass) and (ii) a reflective member such as metal that covers a part of a surface of the spherical transparent member.

Further, the input pen as above is preferably configured so that the retroreflective bead includes a spherical transparent member and an elastic reflective member, the spherical transparent member being fixed at the tip of the input pen, and the elastic reflective member being provided to cover at least a part of a surface of the spherical transparent member, upon contact of the input pen with the surface of the display panel.

When a touch panel input is performed using a conventional input pen having the light source, there are no major variations in an amount of light received by the photosensitive elements mounted inside the liquid crystal display device because an amount of light outputted from the light source does not vary depending on whether or not a pen tip is in contact with the panel surface. As a result, it is difficult to clearly distinguish between a situation where the input pen is in contact with the display panel and a situation where the input pen is not in contact with the display panel.

In contrast, with the above configuration, when the input pen is in contact with the display panel surface, at least a part of a surface of a spherical transparent member is covered with a reflecting member, thus causing the spherical transparent member to be retroreflective. In this way, with the above configuration, characteristics of the tip are changed depending on whether or not the input pen is in contact with the display panel; the tip of the pen is not retroreflective when the input pen is not in contact with the surface of the display panel, and on the other hand, the tip of the pen is retroreflective when the input pen is in contact with the surface of the display panel.

When the tip of the pen is retroreflective, it is possible to efficiently irradiate the light of the backlight on the photosensitive element. As a result, at a time when the input pen touches the liquid crystal display panel, an output of the photosensitive element disposed towards the liquid crystal display panel markedly increases as compared to at a time when the input pen is not in contact with the liquid crystal display panel.

Accordingly, with the above configuration, it is possible to more accurately distinguish between a situation in which the input pen is in contact with the display panel and a situation in which the input pen is not in contact with the display panel.

Glass, for example, may be used as material for the transparent member.

With the input pen as above, the retroreflective bead is preferably made of a material having a refraction coefficient of at least 1.41.

With the above configuration, the retroreflective beads are capable of retroreflecting more incident light.

With the input pen as above, the retroreflective bead is preferably made of a material having a refraction coefficient of 1.9 or above.

With the above configuration, in a case where the input pen is put in contact with the panel surface at an angle of 45° with respect to the panel surface, it is possible to retroreflect the incident light.

Further, in order to solve the above problems, a touch-panel input system in accordance with the present invention includes (i) a touch-panel-integrated display device including a plurality of photosensitive elements for sensing light transmitted through a panel surface, the touch-panel-integrated display device detecting a position of input by having the plurality of photosensitive elements sense an image on a surface of a display panel, and (ii) any one of the above input pens for performing an input to the touch-panel-integrated display device.

With the touch-panel input system in accordance with the present invention, because the touch panel input is performed by using any one of the above input pens, the photosensitive elements provided in the display device are capable of detecting the position of the pen tip that is put in contact with the panel surface more easily and more accurately. As a result, it becomes possible to perform a more accurate position detection in the touch-panel input system.

A fuller understanding of the other objectives, characteristics and merits of the present invention can be obtained through the ensuing description. Further, the advantages of the present invention will become obvious by referring to the following description taken in conjunction with the accompanying drawings.

Figure 1:
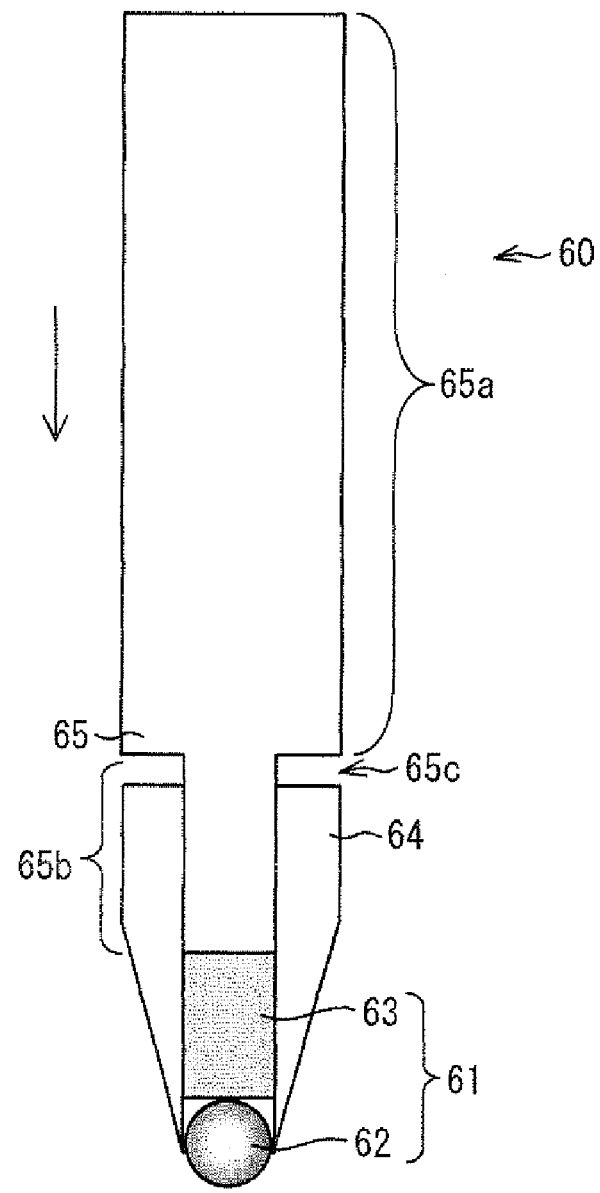
FIG. 1 is a sectional view of a configuration of an input pen in accordance with one embodiment of the present invention.

REFERENCE SIGNS LIST 10 backlight
20 liquid crystal display panel
21 active matrix substrate
22 counter substrate
23 liquid crystal layer
24 color filter layer
30 photosensitive element
30a photosensitive element
30b photosensitive element
60 input pen
61 retroreflective member (retroreflective bead)
62 spherical glass (retroreflective member, spherical transparent member)
63 reflective member (retroreflective member)
64 pointed component
65 holding component
100 touch-panel-integrated liquid crystal display device (display device)
x longitudinal direction of input pen
P pole of spherical glass
G core of spherical glass

DESCRIPTION OF EMBODIMENTS

The following is an explanation of one embodiment of the present invention, with reference to FIGS. 1 to 5. It must be noted that the present invention is not limited to the following description.

The present embodiment describes a touch-panel input system including: a touch-panel-integrated liquid crystal display device that has a touch-panel function; and an input pen that is used for inputting information by having the input pen be in contact with a panel surface of the touch-panel-integrated liquid crystal display device.

Figure 2:
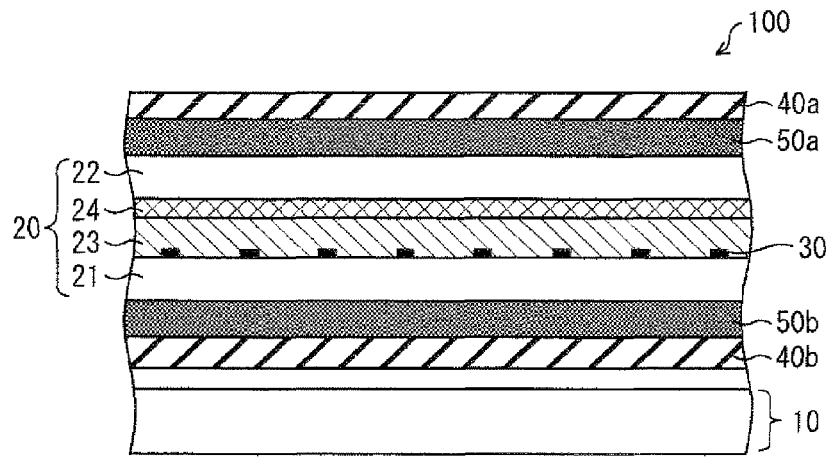
FIG. 2 is a sectional view of a configuration of a touch-panel-integrated liquid crystal display device in accordance with one embodiment of the present invention.

First, the following is an explanation of a touch-panel-integrated liquid crystal display device in accordance with the present embodiment, with reference to FIG. 2. A touch-panel-integrated liquid crystal display device 100 (also called the liquid crystal display device 100) has a touch-panel function that detects a position of input by having photosensitive elements provided for each pixel sense an image on a surface of a display panel.

As shown in FIG. 2, the touch-panel-integrated liquid crystal display device 100 includes a liquid crystal display panel 20 and a backlight 10. The backlight 10 is provided on a backside of the liquid crystal display panel and irradiates light on the display panel.

The liquid crystal display panel 20 includes (i) an active matrix substrate 21 including a plurality of pixels disposed in a matrix configuration, (ii) a counter substrate 22 disposed so as to face the active matrix substrate 21, and (iii) a liquid crystal layer 23 sandwiched between the two substrates. The liquid crystal layer 23 serves as a display medium.

A front wave plate 50a and a back wave plate 50b are provided as optical compensation elements, respectively on an outer side of the active matrix substrate 21 and on an outer side of the counter substrate 22. In a case where a liquid crystal material contained in the liquid crystal layer is of a vertical alignment type for example, the front wave plate 50a and the back wave plate 50b are disposed so as to improve transparency or angle characteristics. It should also be noted that display is performable even when such wave plates are not provided.

Further, a front polarization plate 40a and a back polarization plate 40b are additionally provided on an outer side of the front wave plate 50a and on an outer side of the back wave plate 50b, respectively.

Each of the polarization plates 40a and 40b serve as polarizers. For example, in a case where a liquid crystal material contained in the liquid crystal layer is of a vertical alignment type, the front polarization plate 40a and the back polarization plate 40b are disposed so that polarization directions of the front polarization plate 40a and the back polarization plate 40b have a crossed Nicols relationship, in order to achieve a normally black mode liquid crystal display device.

The active matrix substrate 21 includes a TFT, an alignment film (not shown), photosensitive elements 30 and the like. The TFT and alignment film serve as a switching element for driving each pixel.

Further, in the counter substrate 22, a color filter layer 24, a counter electrode, an alignment film (both not shown) and the like are provided. The color filter layer 24 includes colored sections whose respective colors are red (R), green (G) and blue (B), and a black matrix.

As described above, in the touch-panel-integrated liquid crystal device 100 in accordance with the present embodiment, photosensitive elements are provided in each pixel area, thus making area sensing possible. In this way, when the input pen touches a specific location on a surface of the liquid crystal display panel 20, the photosensitive elements 30 perceives this location, inputs information into a device and makes it possible for an intended operation to be performed. Accordingly, the photosensitive elements 30 make it possible to achieve the touch-panel functionality in the touch-panel-integrated liquid crystal device 100 in accordance with the present embodiment.

In the present invention, it is not absolutely required to provide a photosensitive element for each single pixel, and it is possible to employ a configuration in which a photosensitive element is provided for each pixel having a color filter of any color among R, G and B.

Further, possible configurations of the touch-panel-integrated liquid crystal display devices are not strictly limited to the configurations described above, and it is possible to employ configurations similar to that of conventionally known liquid crystal display devices that include the photosensitive elements.

Next is an explanation of a configuration of an input pen used to perform a touch-panel input to the touch-panel-integrated liquid crystal display device 100. FIG. 1 shows a sectional view of a configuration of an input pen 60 in accordance with the present embodiment.

As shown in FIG. 1, a retroreflective member 61 is provided on a tip of the input pen 60. The retroreflective member 61 is a member that reflects incident light mainly to a direction from which the light is incident.

The input pen 60 in accordance with the present embodiment includes a retroreflective member 61, which is made from a spherical glass 62 (spherical transparent member) and a reflective member 63. The spherical glass 62 may be made of another transparent member, such as resin. Concrete examples of the transparent member include polycarbonate, epoxy, acrylic, and polyolefin. The reflective member 63 is an elastic body in which a metallized film of aluminum or the like is provided on a surface of contact with the spherical glass 62. Silicon rubber and the like may be used as material for the elastic body.

Further, as shown in FIG. 1, the input pen 60 includes, in addition to the retroreflective member 61, a pointed component 64 and a holding component 65. The pointed component 64 is externally shaped as a cylinder and becomes shaped narrower towards a direction of a tip of the input pen 60. Further, the spherical glass 62 is fixed to the tip of the pointed component 64. The holding component 65 is a part held by a user when the user grips the input pen 60. Each of the above-described components is made of a material such as plastic or the like.

As shown in FIG. 1, the holding component 65 includes a holding section 65a for the user to hold the input pen 60 and a protruding section 65b that is narrower than the holding component 65a. The reflective member 63, which has a thickness substantially similar to that of the protruding section 65b, is attached to an extremity of the protruding section 65b. Further, the protruding section 65b of the holding component 65 is inserted inside a hollow space inside the cylindrical pointed member 64. When the input pen 60 is not in use, a gap 65c exists between the pointed component 64 and the holding section 65a of the holding component 65, as shown in FIG. 1.

This gap 65c makes it possible to push down the holding section 65a in a direction of the arrow indicated in FIG. 1. The gap 65c is sized so that at least a part of a surface of the spherical glass comes in contact with the reflective member 63 when the holding section 65a is pushed down in the direction of the arrow. The pushing down of the holding section 65a causes the holding section 65a and the pointed component 64 to be in contact with each other, which causes the elastic reflective member 63 to be compressed and be sunk downwards. The spherical glass 62 located at the tip of the input pen 60 is fixed to the pointed component 64. Hence, when the holding section 65a is pushed down in a direction indicated by the arrow in FIG. 1, the compressed reflective member 63 is pressed against the surface of the spherical glass 62, without causing any shift in the position of the spherical glass 62. The retroreflective member 61 is obtained by having the reflective member 63 be pressed against the surface of the spherical glass 62 as above.

In this way, in the present embodiment, the retroreflective member 61 is achieved as a retroreflective bead. However, the present invention is not necessarily limited to such a configuration.

Figure 3:
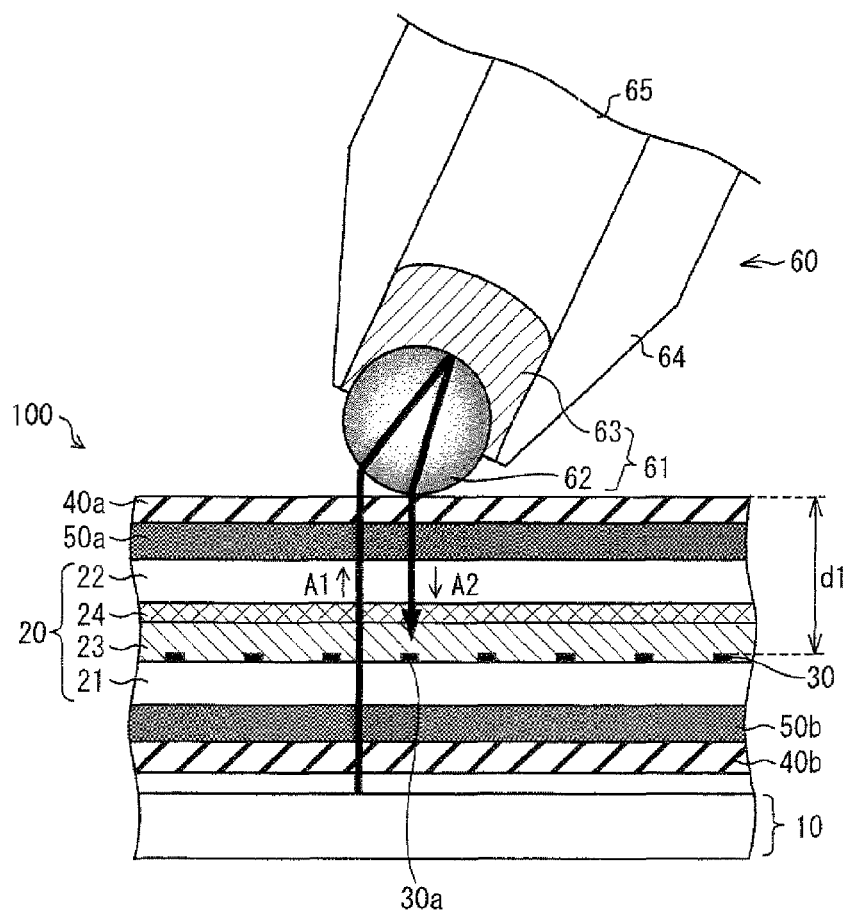
FIG. 3 is a schematic view of a configuration of a touch-panel input system in accordance with one embodiment of the present invention, illustrating a situation in which an input is performed to the touch-panel-integrated liquid crystal display device shown in FIG. 2 by using the input pen shown in FIG. 1.

Next is an explanation, conducted with reference to FIG. 3, of a method to perform a touch panel input to the touch-panel-integrated liquid crystal display device 100 by using an input pen 60 having a configuration as above.

Light having a directivity substantially perpendicular to the panel surface of the liquid crystal display device 100 (i.e. a directivity corresponding to arrow A1) is irradiated from the backlight 10. When the input pen 60 is in contact with the panel surface of the liquid crystal display device 100, the holding section 65a of the input pen 60 moves in the direction of the arrow indicated in FIG. 1, in such a manner that the elastic reflective member 63 is compressed and sinks down so as to cover the surface of the spherical glass 62. FIG. 3 illustrates a situation in which the reflective member 63 is sunk down as a result of a counteraction caused by having the spherical glass 62 located on the tip of the input pen 60 be in contact with the panel surface of the liquid crystal display device 100.

In this way, by touching the panel surface with the input pen 60, it is possible to obtain a retroreflective member 61 which is made up of the spherical glass 62 and the reflective member 63. Light from the backlight and incident on the spherical glass 62 is retroreflected by the retroreflective member 61. As a result, light reflected by the reflective element 63 is incident on the liquid crystal display device 100 with a directivity substantially perpendicular to the panel surface of the liquid crystal display device 100 (i.e. a directivity corresponding to arrow A2).

Figure 6:
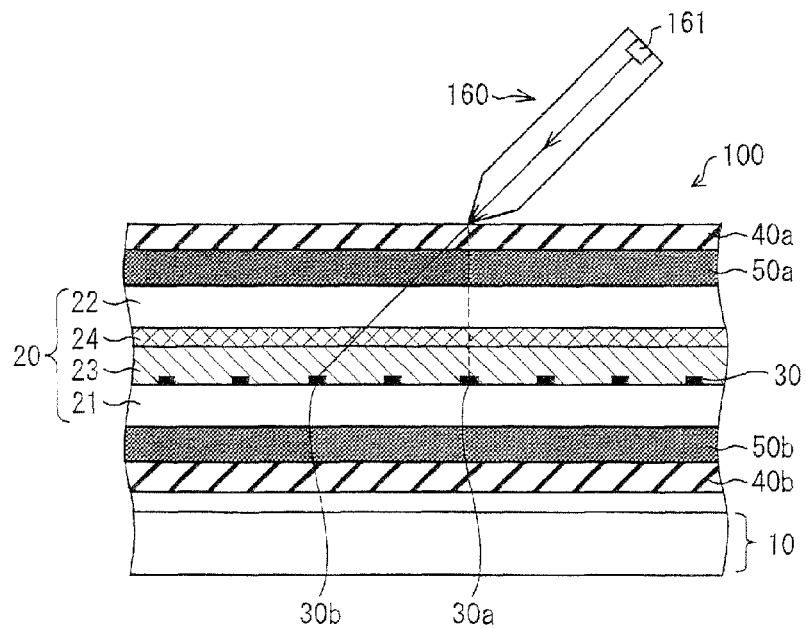
FIG. 6 is a schematic view of a situation in which an input is performed to the touch-panel-integrated liquid crystal display device by using a conventional input pen in which a light source is mounted.

For comparison purposes, the following is an explanation of a case where a touch-panel input into the touch-panel-integrated liquid crystal display device 100 is performed using a conventional input pen provided with a light source. FIG. 6 illustrates a situation in which an input is performed to the touch-panel-integrated liquid crystal display device 100 by using an input pen 160 including a light source. The input pen 160 illustrated in FIG. 6 is provided with a light source 161 such as a light-emitting diode. The light source 161 has a directivity like a directivity indicated by the arrow in FIG. 6, and irradiates light from a tip of the input pen 160.

Thus, as shown in FIG. 6, if the pen is put in contact obliquely with the panel surface, the light irradiated from the input pen is detected as having a higher amount of light by the photosensitive element 30b that is disposed at a slightly shifted location, rather than being detected by the photosensitive element 30a that is disposed directly under the actual position of input. As a result, when a touch panel input is performed to the liquid crystal display device 100 by using the input pen 160, the input is detected as being performed directly above the photosensitive element 30b that is disposed at a slightly shifted location, and not detected as being performed directly above the photosensitive element 30a that is disposed at the actual position of input. In this way, with the input pen provided with the light source, input is erroneously sensed as being performed at a position slightly shifted from the actual position of input.

In contrast, in a case where the input pen 60 in accordance with the present embodiment is used, the input pen 60 has the retroreflective member 61 provided at its tip, as shown in FIG. 2. This retroreflective member 61 allows the light from the backlight whose directivity (indicated by the arrow A1 in FIG. 3) is substantially perpendicular to the panel surface of the liquid crystal display device 100 to be irradiated from the tip of the input pen 60 also as a light whose directivity (indicated by the arrow A2 in FIG. 3) is substantially perpendicular to the panel surface. In other words, the light irradiated from the backlight and the light reflected by the retroreflective member 61 are parallel to each other however oriented in opposite directions to each other.

As a result, when a touch panel input into the liquid crystal display panel 100 is performed by using the input pen 60, the photosensitive element 30a located directly under the position of the touch-panel input detects a highest amount of light. As a result, it is possible to detect the position of the touch-panel input more precisely.

Further and as has been explained above, the input pen 60 in accordance with the present embodiment has the surface of the spherical glass 62 not covered by the reflective member 63, as shown on FIG. 1, while the tip of the input pen 60 is not in contact with a flat surface such as a panel surface of a liquid crystal display device. In such a case, the light incident on the spherical glass 62 is not retroreflected. On the other hand, when the tip of the input pen 60 is in contact with the panel surface of the liquid crystal display device (as shown in FIG. 3), the surface of the spherical glass 62 is covered by the reflective member 63. This allows the light incident on the spherical glass 62 to be retroreflected.

Figure 4:
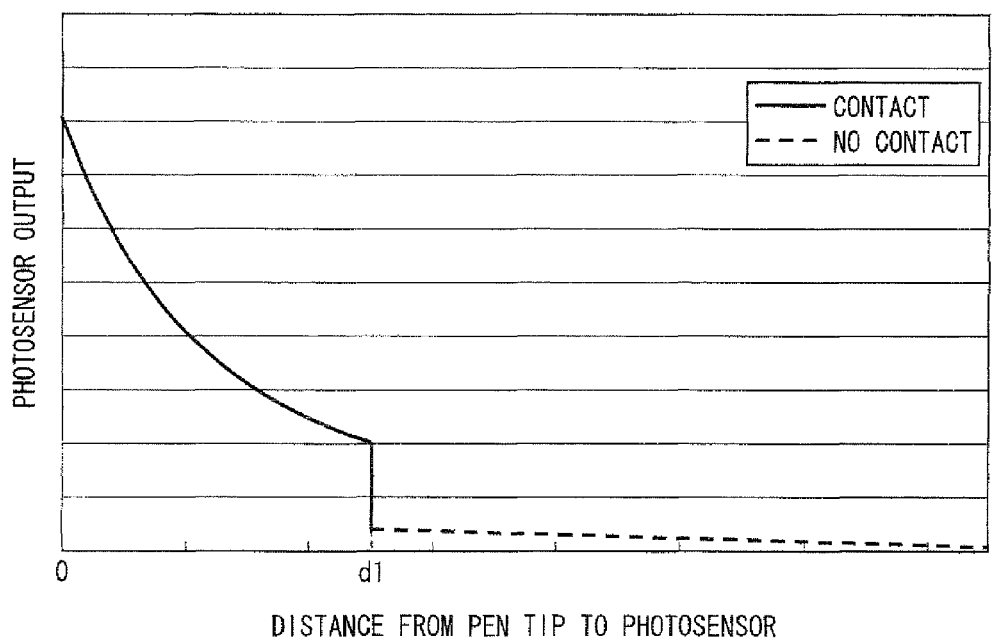
FIG. 4 is a graph illustrating a relation between (i) a distance from a pen tip of an input pen to a surface on which a photosensitive element (photosensor) is positioned and (ii) an output of the photosensitive element.

As a result, the input pen 60 causes the amount of light received by the photosensitive elements 30 and an output of the photosensitive elements 30 to remarkably vary, depending on whether or not the tip of the pen is in contact with the panel surface. FIG. 4 is a graph illustrating a relation between (i) a distance from the pen tip of the input pen 60 to a surface on which the photosensitive elements 30 are disposed and (ii) an output of the photosensitive elements 30. In FIG. 4, the broken line represents the output of the photosensitive elements 30 at a time when the input pen 60 is not in contact with the panel surface (no contact), and the solid line represents an output of the photosensitive elements 30 at a time when the input pen 60 is in contact with the panel surface (contact).

At the time when the input pen 60 is not in contact with the panel surface (no contact), the output of the photosensitive elements increases gradually as the distance from the tip of the pen to the photosensitive elements (i.e. moving from right to left along the line in FIG. 4) shortens. Then, when a point is reached where the distance from the tip of the pen to the photosensitive elements is equal to d1, the output of the photosensitive elements 30 increases markedly. In the embodiment, d1 is a distance from a top surface of the liquid crystal display device 100 to a surface on which the photosensitive elements 30 are located (see FIG. 3). In this way, the output of the photosensitive elements 30 changes significantly depending on whether the tip of the input pen 60 is in contact or is not in contact with the panel surface. As a result, it is possible to more clearly distinguish between a situation where the input pen 60 is in contact with the surface of the liquid crystal display panel and a situation where the input pen 60 is not in contact with the surface of the liquid crystal display panel.

The "distance from the pen tip to the photosensitive elements" represented by the horizontal axis in the graph of FIG. 4 does not in reality become smaller than d1. In the graph of FIG. 4, a theoretical value is indicated for the distance from the tip of the pen to the photosensitive element in a hypothetical case where the distance from the tip of the pen to the photosensitive element is lower than d1.

Further, with the input pen in accordance with the present invention, when using a retroreflective bead as the retroreflective element, a refraction coefficient of the spherical glass 62 (bead) is preferably at least 1.41. If the refraction coefficient is at least 1.41, the spherical glass has retroreflective characteristics. Further, a higher reflection coefficient makes it possible to accurately retroreflect incident light even if the input pen is used obliquely. If the refraction coefficient is 1.9 or above, it is possible to retroreflect the incident light even if the input pen is put in contact with the panel surface at an angle of 45°. Further, with a refraction coefficient of 2.0, it is possible to retroreflect the incident light even if the contact is performed with the input pen inclined to the degree that the input pen is substantially parallel to the panel surface.

Moreover, the reflective element 63 further preferably includes the following configuration.

Figure 5:
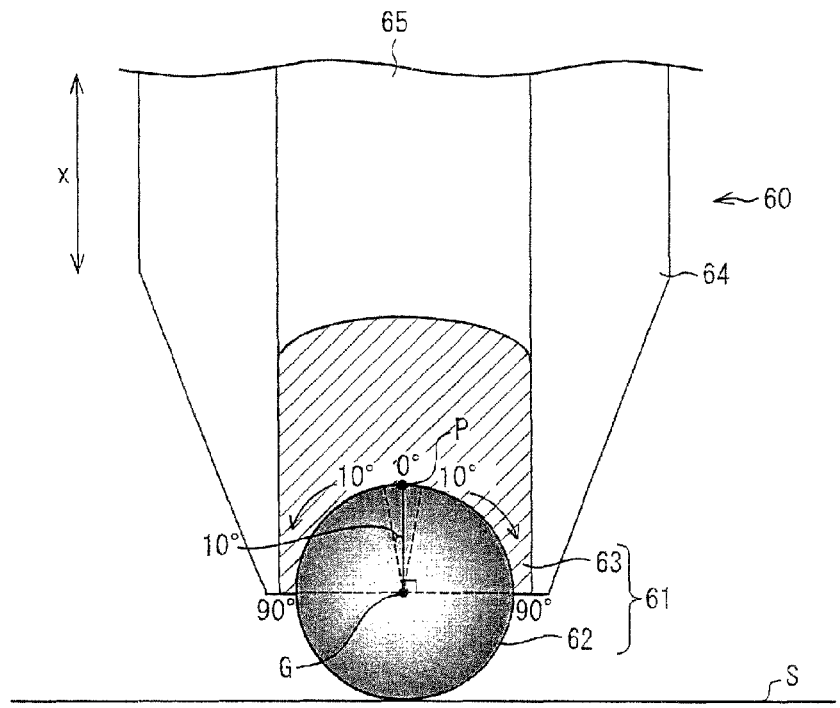
FIG. 5 is a schematic view of a structure in a situation where a tip of the input pen is in contact with a flat surface.

In concrete terms, two spots on the surface of the spherical glass 62 which are located in a longitudinal direction x of the input pen 60 with respect to a center G of the spherical glass 62 are set as poles. Among these two poles, the one pole which is farthest from the tip of the input pen is called pole P, and a position of pole P is considered to be 0°. When the input pen is put in contact with the surface of the display panel, the reflective member 63 is preferably in contact with the surface of the spherical glass 62 at an angle in a range from 10° to 90° where the 0° pole is a point of reference, so as to cover part of the spherical glass surface. FIG. 5 illustrates a situation in which the tip of the input pen 60 is in contact with a surface S of a liquid crystal panel and the like, in a substantially perpendicular manner.

In a case where the tip of the input pen is in contact with the surface S of a liquid crystal display panel and the like in a substantially perpendicular manner, as long as the reflective member 63 covers the surface of the spherical glass 62 at a range of at least 10°, most of the light incident on the spherical glass 62 is reflected within such a range. As a result, the light incident on the spherical glass 62 is irradiated from the spherical glass 62 towards the same direction as the incident direction, after the incident light is reflected by the reflection member 63. In this way, it is possible to retroreflect incident light more accurately when the input pen is in contact with the surface of the display panel.

Further, the spherical glass 62 is connected to the pointed component 64 at a location corresponding to an angle of 90° with respect to the pole P that serves as reference. As a result, when the tip of the pen is put in contact with the surface S of the liquid crystal display panel and the like, the elastic reflective member 63 covers a maximal range of 90° of the spherical glass 62 surface.

The present invention is not limited to the above-described embodiments, and various modifications are possible within the scope of the following claims. Embodiments obtained by combining the technical means disclosed here as appropriate are also included within the technical scope of the present invention.

As above, an input pen in accordance with the present invention is an input pen used to perform an input into a touch-panel-integrated display device, wherein the touch-panel-integrated display device (i) includes a plurality of photosensitive elements sensing light transmitted from a surface of a panel and (ii) detects a position of input thanks to the photosensitive elements sensing pixels of the surface of the panel, a retroreflective member being provided on a tip of the input pen in contact with the display panel.

Accordingly, with the above configuration, it is possible to retroreflect for example light irradiated from a backlight and passed through a display panel, by use of the retroreflective member provided on the pen tip of the input pen. In this way, an amount of light irradiated from the pen tip is markedly higher than an amount of light irradiated from other positions, thereby making it possible to perform a position detection more easily and more accurately.

Further, even if the input pen is put in contact with the panel at an inclined angle, the photosensitive elements that are disposed directly under the position of input are able to sense a high amount of light. As a result, it is possible to perform a more accurate detection of the inputted position.

Further, a touch-panel input system in accordance with the present invention includes (i) a touch-panel-integrated display device including a plurality of photosensitive elements for sensing light transmitted through a panel surface, the touch-panel-integrated display device detecting a position of input by having the plurality of photosensitive elements sense an image on a surface of a display panel, and (ii) any one of the above input pens, for performing an input to the touch-panel-integrated display device.

With the above configuration, it is possible to achieve a touch-panel input system that is capable of detecting a more accurate position detection.

The detailed explanations of the invention which were given above in connection with concrete embodiments and examples are merely intended to clarify the technical contents of the present invention. The present invention should not be construed to be limited to these examples and embodiments, and various modifications can be exercised within the spirit of the invention and the scope of the following claims.

INDUSTRIAL APPLICABILITY

By performing an input to a touch panel by use of the input pen in accordance with the present invention, a touch-panel-integrated liquid crystal display device is capable of detecting a position more accurately. The input pen in accordance with the present invention is usable in touch-panel input systems.

The invention claimed is:

1. An input pen for performing an input to a touch-panel-integrated display device, the touch-panel-integrated display device comprising: a plurality of photosensitive elements for sensing light transmitted through a panel surface, the touch-panel-integrated display device detecting a position of input by having the plurality of photosensitive elements sense an image on a surface of a display panel, and the input pen comprising:

a retroreflective member being provided at a tip of the input pen that is to be in contact with the display panel;

the retroreflective member being a retroreflective bead;

the retroreflective beam comprising a spherical transparent member and an elastic reflective member;

the spherical transparent member being fixed at the tip of the input pen;

the retroreflective member having a gap between the spherical transparent member and the elastic reflective member, the gap allowing the elastic reflective member to be compressed and sunk downwards in a case where the spherical transparent member comes in contact with the surface of the display panel;

the elastic reflective member not covering a surface of the spherical transparent member in a case where the spherical transparent member is not in contact with the surface of the display panel; and the elastic reflective member being sunk into the gap to as to cover a part of the surface of the spherical transparent member in a case where the spherical transparent member comes in contact with the surface of the display panel.

2. The input pen according to claim 1, wherein the retroreflective bead is made of a material having a refraction coefficient of at least 1.41.

3. The input pen according to claim 2, wherein the retroreflective bead is made of a material having a refraction coefficient of 1.9 or above.

4. A touch-panel input system comprising: a touch-panel-integrated display device including a plurality of photosensitive elements for sensing light transmitted through a panel surface, the touch-panel-integrated display device detecting a position of input by having the plurality of photosensitive elements sense an image on a surface of a display panel; and an input pen as set forth in claim 1, for performing an input to the touch-panel-integrated display device.

* * * * *